United States Patent Office 3,574,714
Patented Apr. 13, 1971

3,574,714
α,α-DIACYLOXY-2,3,4,5,6-PENTACHLORO-
TOLUENE DERIVATIVES
Akira Fujinami, Takarazuka-shi, Katsuji Nodera, Nishi-
nomiya-shi, Yoshihiko Nishizawa, Nara-shi, and Toshi-
aki Ozaki and Sigeo Yamamoto, Toyonaka-shi, and
Toshiyuki Wakatsuki, Kyoto, Japan, assignors to Sumi-
tomo Chemical Company, Ltd., Osaka, Japan
No Drawing. Filed Feb. 5, 1968, Ser. No. 702,813
Claims priority, application Japan, Feb. 22, 1967,
42/11,629; Mar. 1, 1967, 42/13,330
Int. Cl. C07c 69/62; A01n 9/24
U.S. Cl. 260—487                                5 Claims

ABSTRACT OF THE DISCLOSURE

A novel α,α-diacyloxy-2,3,4,5,6-pentachlorotoluene derivative represented by the formula,

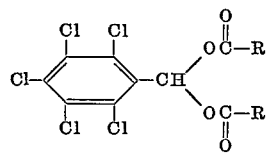

wherein R is a lower alkyl group, a lower alkenyl group or a halogen-substituted-lower alkyl group, is prepared by reacting pentachlorobenzaldehyde with an acid anhydride represented by the formula,

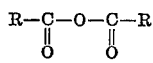

wherein R has the same meanings as identified above.

Typical examples of the groups represented by R are methyl, chloromethyl, ethyl and n-propyl.

The compounds thus obtained have an excellent fungicidal activity, very low toxicity to fish and warm blooded animals and have no phototoxicity on crops.

---

The present invention relates to novel and fungicidal activity-having α,α-diacyloxy-2,3,4,5,6-pentachlorotoluene derivatives. More particularly, the present invention relates to novel α,α-diacyloxy-2,3,4,5,6-pentachlorotoluene derivatives represented by the formula:

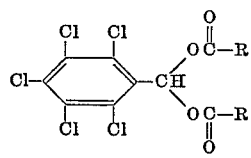

wherein R represents a lower alkyl group having up to 4 carbon atoms, a lower alkenyl group having up to 4 carbon atoms, or a halogen-substituted lower alkyl group having up to 4 carbon atoms and, a process for preparation thereof and to novel agricultural fungicidal compositions characterized by containing one or more than one thereof as an effective ingredient.

For the control of rice blast, organomercury compounds have effectively been used every year in large quantities. However, the use of such compounds containing an element poisonous to the human body is a serious problem not only for those engaged in agriculture who handle the compounds but also for general consumers. Rice blast is a plant disease which gives the greatest damage to the rice crop. In order to prevent such disease, there has been desired the advent of fungicides which are strong in fungicidal activity and which are non-toxic towards mammals and have no phytotoxicity on crops.

In order to satisfy the above desire, the inventors synthesized many novel compounds, and examined the fungicidal activities thereof. As the results, the inventors have found that the compounds represented by the above Formula I have a strong fungicidal activity.

One object of the present invention is to provide the novel α,α-diacyloxy-2,3,4,5,6-pentachlorotoluene derivatives represented by the above Formula I, and the process for the preparation thereof.

Further, another object of the present invention is to provide fungicidal compositions containing an effective amount of α,α-diacyloxy-2,3,4,5,6-pentachlorotoluene derivative, an inert carrier, or a diluent.

Still other objects will be apparent from the following description.

In order to accomplish these objects the present invention provides nonel α,α-diacyloxy-2,3,4,5,6-pentachlorotoluene derivatives represented by the Formula I and a process for preparation thereof which comprises reacting an acid anhydride represented by the Formula II of the formula,

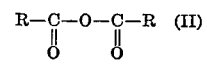

wherein R has the same meanings as identified above, with pentachlorobenzaldehyde.

Furthermore, the present invention provides fungicidal compositions containing a fungicidally effective amount of the α,α-diacyloxy-2,3,4,5,6-pentachlorotoluene derivative represented by the above Formula I as an essential ingredient, and an inert carrier or diluent.

The compounds of the present invention can be obtained in general in high yields by adding 2,3,4,5,6-pentachlorobenzaldehyde to the equivalent amount of acid anhydride in the presence or absence of a suitable reaction medium, if necessary, adding thereto a catalytic amount of sulfuric acid, glacial acetic acid or phosphorus trichloride, and heating the reaction mixture with stirring for 0.5 to 10 hours to obtain an objective α,α-diacyloxy-2,3,4,5,6-pentachlorotoluene derivative. In case a reaction medium is used, an inert solvent such as, for example, benzene, toluene, ether, chloroform, carbon tetrachloride and so on is used, and the reaction mixture is refluxed. After the reaction is over, the reaction mixture is cooled, washed with water, dried over anhydrous sodium sulfate and then concentrated to remove the solvent. As the result, the desired α,α-diacyloxy-2,3,4,5,6-pentachlorotoluene derivative is obtained in high yield and in almost pure state.

Typical examples of acid anhydrides represented by the Formula II which are used in the present invention are as shown below, but the scope of the present invention is not limited thereby.

Acetic anhydride, monochloroacetic anhydride, dichloroacetic anhydride, trichloroacetic anhydride, propionic anhydride, butyric anhydride, α,α-dichloropropionic anhydride, β-chloropropionic anhydride, and α-chloropropionic anhydride.

Typical compounds among the compounds represented by the Formula I are as recited below, but the compounds satisfying the scope of the present invention are of course not limited thereby.

Compound No.     Chemical formula (1) 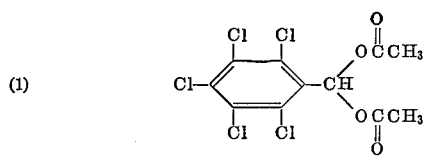

(2) 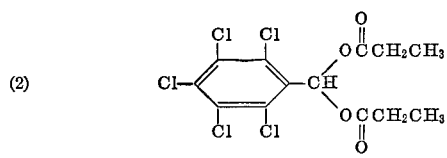

(3) 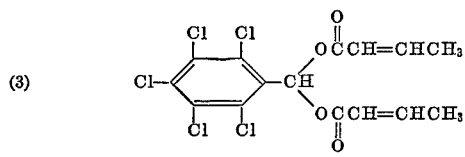

(4) 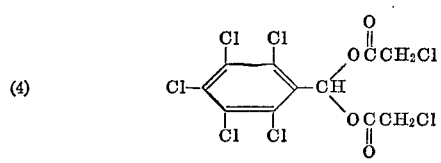

(5) 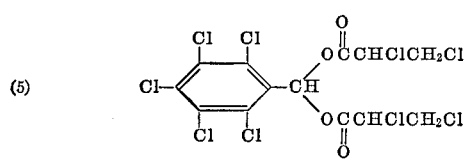

(6) 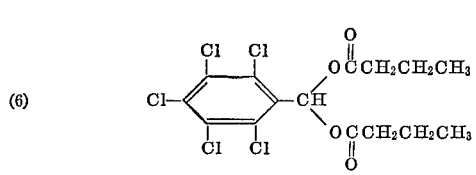

All the α,α-diacyloxy-2,3,4,5,6-pentachlorotoluene derivatives represented by the Formula I which are obtained according to the process of the present invention are novel compounds which have an excellent fungicidal activity. Especially, they have prominent effects on rice blast fungus (*Piricularia oryzae*) and very low toxicity to fish and warm blooded animals, and have no phytotoxicity to crops, and desirable characteristics as agricultural fungicides. In addition, the present compounds contain no such injurious heavy metal as contained in mercury preparations, and hence have great advantages in that they are less toxic and safe in handling the compounds and a great value as fungicides usable in place of the mercury preparations.

In actual application, the present compounds may be used in pure form without incorporation of other components, or they may be used in admixture with inert carriers for easier application as agricultural fungicides, and can be used in any of the ordinarily adopted forms such as dusts, wettable powders, emulsifiable concentrates, granules. The usable carriers may be in any form of solid or liquid, and as solid carriers, are used, for example, clay, talc, diatomaceous earth, bentonite, kaolin, acid clay, vermiculite, etc. and as liquid carriers, are used, for example, water, alcohol, acetone, benzene, toluene, solvent naphtha, petroleum ether, etc. The preparations as above may be applied after dilution thereof with a nonsolvent such as water or as they are without any dilution thereof by means of spraying or dusting, etc.

Further, the compounds may be used in admixture with other chemicals, whereby the scope of the application thereof can be made more broad. For example, it is not objectionable at all to use the present compounds in admixture with antibiotics such as Blasticidin-S, and Kasugamycin, etc., organo-phosphorus fungicides such as O,O-diethyl-S-benzylphosphorothiolate and O-ethyl-S,S-diphenylphosphorodithiolate, or organo-arsenic fungicides such as iron methylarsonate and the like. Further, for the purpose of simultaneous control of 2 or more kinds of injurious insects and plant diseases, they may be used in admixture with such insecticides as γ-1,2,3,4,5,6-hexachlorocyclohexane, O,O-dimethyl-O-(p-nitrophenyl)phosphorothioate, O,O-dimethyl s - 1,2 - di(ethoxycarbamoyl) ethyl phosphorodithioate, O,O-dimethyl s-(N-methylcarbamoylmethyl) phosphorodithioate, O-ethyl O-p-nitrophenyl phenylphosphonothioate, O,O-dimethyl-O-(p-nitro-m-methylphenyl)phosphorothioate, 3,4 - dimethylphenyl-N-methylcarbamate, O,O - diethyl O-(2 - isopropyl - 4-methyl-6-pyrimidinyl)phosphorothioate, α - naphthyl N-methylcarbamate, etc. and the mixture may be further incorporated with the aforesaid fungicides. Furthermore, they may be used in admixture, in addition thereto, with such agricultural chemicals as herbicides, nematocides and acaricides, and with fertilizers.

The present invention will be illustrated in further detail below with reference to examples, but it is needless to say that the kinds and mixing proportions of compounds and additives are variable within wide ranges without being limited to those described in the examples. In the examples, the names of compounds are represented by the compound number as shown before. Parts are by weight.

EXAMPLES 1-4

α,α,diacyloxy-2,3,4,5,6 - pentachlorotoluene derivatives as shown in Table 1 were generally prepared in the following manner:

1.0 mol of 2,3,4,5,6-pentachlorobenzaldehyde and 1.1 mol of each acid anhydride listed in the Table 1 were dissolved in 1.0 kg. toluene, to which 0.5 g. concentrated sulfuric acid was added as a catalyst and the reaction mixture was refluxed with stirring for 5 hours. The reaction mixture was cooled, washed with water, dried over anhydrous sodium sulfate and concentrated under a reduced pressure to remove the toluene. The desired, α,α-diacyloxy-2,3,4,5,6-pentachlorotoluene derivative was obtained in pure form and in good yield.

α,α-Diacyloxy-2,3,4,5,6-pentachlorotoluene prepared

| Example | Aldehyde | Acid anhydride | Structural formula | Physical constant, M.P., °C. | Yield, percent | Elementary analysis | | | | | | |
|---|---|---|---|---|---|---|---|---|---|---|---|---|
| | | | | | | Calculated | | | | Found | | |
| | | | | | | O | H | Cl | | O | H | Cl |
| 1 | 2,3,4,5,6-pentachlorobenzaldehyde | Acetic anhydride | Cl-C6Cl4-CH(OCCH3)2=O | 139[1] | 90 | 34.73 | 1.85 | 46.60 | | 34.96 | 1.70 | 47.12 |
| 2 | ...do... | Monochloroaceticanhydride | Cl-C6Cl4-CH(OCCH2Cl)2=O | 120–122 | 85 | 29.40 | 1.12 | 55.23 | | 29.08 | 1.12 | 55.25 |
| 3 | ...do... | Propionic anhydride | Cl-C6Cl4-CH(OCCH2CH3)2=O | 115.5–118 | 90 | 38.22 | 2.71 | 43.40 | | 37.93 | 2.48 | 43.56 |
| 4 | ...do... | Butyricanhydride | Cl-C6Cl4-CH(OCCH2CH2CH3)2=O | 71–73.0 | 90 | 41.27 | 3.46 | 40.61 | | 40.90 | 3.32 | 40.87 |

[1] Decomposed.

EXAMPLE 5

20 parts of the compound shown by the above-mentioned compound No. 2, 20 parts of an emulsifier of polyoxyethylene-alkylphenol ether type and 60 parts of xylene were mixed together to obtain an emulsifiable concentrate containing 20% of active ingredient. In application, the emulsifiable concentrate was diluted with water, and the solution was sprayed.

EXAMPLE 6

10 parts of the compound shown by the above-mentioned compound No. 1, 10 parts of an emulsifier of polyoxyethylene-alkylphenol ether type, 60 parts of cyclohexanone, and 20 parts of xylene were mixed together to obtain an emulsifiable concentrate containing 10% of active ingredient. In application, the emulsifiable concentrate was diluted with water, and the solution was sprayed.

EXAMPLE 7

50 parts of the compound shown by the above-mentioned compound No. 2, 5 parts of a wetting agent of an alkylbenzenesulfonate type and 45 parts of diatomaceous earth were thoroughly pulverized and mixed together to obtain a wettable powder containing 50% of active ingredient. In application, the wettable powder was diluted with water and the solution was sprayed.

EXAMPLE 8

3 parts of the compound shown by the above-mentioned compound No. 4, and 97 parts of a clay were thoroughly pulverized and mixed together to obtain a dust containing 3% of active ingredient. In application, the dust was sprayed in such state.

EXAMPLE 9

4 parts of the compound shown by the above-mentioned compound No. 3 and 96 parts of a talc-clay mixture were thoroughly pulverized and mixed together to obtain a dust containing 4% of active ingredient. In application, the dust is sprayed in such state.

In order to substantiate the excellent fungicidal effects of the present compounds, typical test results will be shown below.

TEST EXAMPLE

To a rice plant (Variety: Waseasahi) which had been cultured in a 9 cm.-in. diameter-flower pot to the 3-leaves stage, each 7 ml. per pot of solutions of test chemicals at given concentrations were individually sprayed. One day later, the rice plant was sprayed and inoculated with a suspension of spores of *Pyricularia oryzae*. 4 days thereafter, the number of generated spots was counted and the fungicidal effects of the test chemicals were investigated to obtain the results as shown in the table below. In the table, the control value shows a value calculated according to the following equation:

$$\text{Control value} = \frac{\text{Number of spots in non-treated area} - \text{Number of spots in treated area}}{\text{Number of spots in non-treated area}} \times 100$$

and each of compound Nos. 1 to 6 is the same as shown by the above-mentioned compound number.

| Compound | Active ingredient [1] | Control value |
|---|---|---|
| Number: | | |
| 1 | 500 | 100 |
| 2 | 500 | 93.4 |
| 3 | 500 | 94.8 |
| 4 | 500 | 100 |
| 5 | 500 | 96.3 |
| 6 | 500 | 96.8 |
| Phenylmercuric acetate | 30 | 95.3 |
| Non-treatment | | 0 |

[1] Concentration, p.p.m.

What we claim is:

1. α,α - diacyloxy - 2,3,4,5,6 - pentachlorotoluene derivatives represented by the formula:

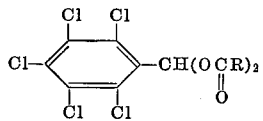

wherein R represents a lower alkyl group having up to 4 carbon atoms, a lower alkenyl group having up to 4 carbon atoms, or a halogen-substituted lower alkyl group having up to 4 carbon atoms.

2. A compound represented by the formula,

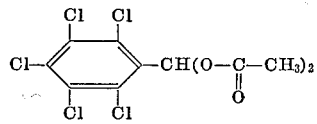

3. A compound represented by the formula,

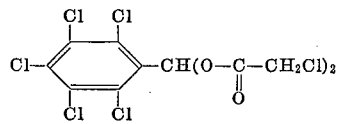

4. A compound represented by the formula,

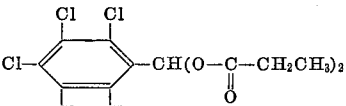

5. A compound represented by the formula,

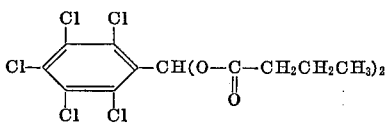

References Cited

UNITED STATES PATENTS

| | | | |
|---|---|---|---|
| 2,312,193 | 2/1943 | Rechter | 260—494 |
| 2,483,852 | 10/1949 | Smith et al. | 260—494 |

FOREIGN PATENTS

| | | | |
|---|---|---|---|
| 621,843 | 6/1961 | Canada | 260—494 |

LORRAINE A. WEINBERGER, Primary Examiner

J. L. DAVISON, Assistant Examiner

U.S. Cl. X.R.

260—486, 488, 494; 424—311, 314